United States Patent
Takagaki (10) Patent No.: US 8,909,432 B2
(45) Date of Patent: Dec. 9, 2014

(54) VEHICULAR ILLUMINATING DEVICE

(75) Inventor: Tatsuya Takagaki, Nissin (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/392,451

(22) PCT Filed: Aug. 18, 2010

(86) PCT No.: PCT/JP2010/063939
§ 371 (c)(1),
(2), (4) Date: Feb. 24, 2012

(87) PCT Pub. No.: WO2011/036967
PCT Pub. Date: Mar. 31, 2011

(65) Prior Publication Data
US 2012/0158254 A1     Jun. 21, 2012

(30) Foreign Application Priority Data

Sep. 25, 2009    (JP) .................................. 2009-221298

(51) Int. Cl.
*B60R 22/00*    (2006.01)
*B60Q 1/08*    (2006.01)
*B60Q 1/18*    (2006.01)

(52) U.S. Cl.
CPC .............. *B60Q 1/18* (2013.01); *B60Q 2300/32* (2013.01); *B60Q 2300/336* (2013.01); *B60Q 2300/45* (2013.01); *B60Q 1/085* (2013.01); *B60Q 2300/335* (2013.01)
USPC ............... 701/49; 701/36; 701/530; 701/408; 362/184; 362/231; 362/519; 362/541; 362/551

(58) Field of Classification Search
USPC .......... 701/1, 49, 36, 530, 408; 362/184, 231, 362/551, 519, 541
See application file for complete search history.

(56) References Cited

U.S. PATENT DOCUMENTS

| | | | | |
|---|---|---|---|---|
| 5,272,483 A | * | 12/1993 | Kato | 342/357.32 |
| 6,040,824 A | * | 3/2000 | Maekawa et al. | 345/173 |
| 6,064,337 A | * | 5/2000 | Hirosawa | 342/357.31 |
| 6,434,482 B1 | * | 8/2002 | Oshida et al. | 701/426 |

(Continued)

FOREIGN PATENT DOCUMENTS

| | | |
|---|---|---|
| CN | 1922612 A | 2/2007 |
| DE | 30 11 394 A1 | 10/1981 |

(Continued)

OTHER PUBLICATIONS

Japanese Office Action mailed Nov. 13, 2012 for Japanese Patent Application No. 2009-221298, English-Language Translation.

(Continued)

*Primary Examiner* — Redhwan k Mawari
(74) *Attorney, Agent, or Firm* — Sughrue Mion, PLLC (57) ABSTRACT

A vehicular illuminating device includes a first illuminating part configured to illuminate in a traveling direction of a vehicle, a second illuminating part configured to be able to emit light by using an illumination pattern different from that of the first illuminating part, and a control part configured to control the second illuminating part so that the second illuminating part can illuminate in a direction of a recommended route by using the illumination pattern different from that of the first illuminating part if a route guiding part is guiding the vehicle to a destination along the recommended route.

2 Claims, 4 Drawing Sheets

(56) References Cited

U.S. PATENT DOCUMENTS

| | | | |
|---|---|---|---|
| 2002/0163547 A1* | 11/2002 | Abramson et al. | 345/855 |
| 2003/0055555 A1* | 3/2003 | Knockeart et al. | 701/202 |
| 2003/0167120 A1* | 9/2003 | Kawasaki | 701/209 |
| 2004/0044470 A1* | 3/2004 | Matsuoka et al. | 701/209 |
| 2004/0122588 A1* | 6/2004 | Ito et al. | 701/207 |
| 2005/0187710 A1 | 8/2005 | Walker | |
| 2009/0157292 A1* | 6/2009 | Currie et al. | 701/200 |
| 2012/0158254 A1* | 6/2012 | Takagaki | 701/49 |

FOREIGN PATENT DOCUMENTS

| DE | 101 34 594 A1 | 1/2003 |
|---|---|---|
| DE | 10 2008 061 747 A1 | 6/2009 |
| JP | 7-032935 A | 2/1995 |
| JP | 09-210716 A | 8/1997 |
| JP | 2002-193026 A | 7/2002 |
| JP | 2005-157873 A | 6/2005 |
| JP | 2005-161977 A | 6/2005 |
| JP | 2005-306337 A | 11/2005 |
| JP | 2007-099078 A | 4/2007 |
| JP | 2007-182151 A | 7/2007 |
| JP | 2008-143505 A | 6/2008 |

OTHER PUBLICATIONS

German Office Action dated Oct. 10, 2013 issued in corresponding German Application No. 11 2010 003 800.7.

* cited by examiner

VEHICULAR ILLUMINATING DEVICE

CROSS REFERENCE TO RELATED APPLICATIONS

This application is a National Stage of International Application No. PCT/JP2010/063939 filed Aug. 18, 2010, claiming priority based on Japanese Patent Application No. 2009-221298 filed Sep. 25, 2009, the contents of all of which are incorporated herein by reference in their entirety.

TECHNICAL FIELD

The present invention relates to a vehicular illuminating device which controls illumination in conjunction with a route guide being executed in a car-mounted navigation device.

BACKGROUND ART

Conventionally, a vehicular headlight (headlamp) has its light axis fixed so that the vehicular headlamp illuminates in a front direction of a vehicle. Alternatively, if a vehicle is turning at a curve or the like, a vehicular headlamp is controlled so that its illumination direction is horizontally changed depending on a turn direction.

Also, an invention concerning a light distribution controlling device has been disclosed (see Patent Document 1 for example). The light distribution controlling device controls a headlamp while a car-mounted navigation device is executing a route guide so that the headlamp illuminates in a direction to be guided prior to an intersection or a bifurcation point of a toll road. This device illuminates in the direction to be guided by widening an area to be illuminated in the direction to be guided through use of an auxiliary illuminating device, or by changing an illumination direction of the headlamp closer to the direction to be guided.

An invention concerning another light distribution controlling device for a headlamp has also been disclosed (see Patent Document 2 for example). The other light distribution controlling device for a headlamp controls at least one of an illumination direction of the headlamp and an area to be illuminated by the headlamp based on a path to be followed by a vehicle and a shape of a road in a traveling direction so that a position to be viewed by a driver is illuminated. This device interprets a command signal when the command signal indicative of the route to be followed is entered from a navigation unit. If the command signal includes a direction indicating signal, the device recognizes a shape of a road through the image processing of a front view image from the vehicle captured by a camera. If the recognized shape of the road matches the direction indicating signal, the device controls at least one of the illumination direction of the headlamp and the area to be illuminated by the headlamp.

[Patent Document 1] Japanese Patent Application Publication No. 2002-193026
[Patent Document 2] Japanese Patent Application Publication No. H07-032935

DISCLOSURE OF THE INVENTION

Problems to be Solved by the Invention

However, the devices disclosed in the Patent Documents 1 and 2 illuminate both a traveling direction and a direction to be guided in the same manner. Thus, the devices cause driver inconvenience in that the driver may find it difficult to notice the direction to be guided in. In addition, if the illumination direction of the headlamp is directed toward the direction to be guided in, due to lack of illumination toward a traveling direction of a vehicle, the devices may cause a situation where a field of front vision is not ensured.

The present invention is intended to solve such problems. The main object of the present invention is to provide a vehicular illuminating device which can inform a driver of a direction of a recommended route in an easily comprehensible manner while ensuring a field of vision in a traveling direction of a vehicle.

Means for Solving Problems

An aspect of the present invention to achieve the object above is a vehicular illuminating device including a first illuminating part configured to illuminate in a traveling direction of a vehicle, a second illuminating part configured to be able to emit light by using an illumination pattern different from that of the first illuminating part, and a control part configured to control the second illuminating part so that the second illuminating part can illuminate in a direction of a recommended route by using the illumination pattern different from that of the first illuminating part if a route guiding part is guiding the vehicle to a destination along the recommended route.

The illumination pattern in the present invention includes at least one of color, luminance, and difference between blinking and always-on, as a parameter.

The first illuminating part and the second illuminating part may be configured to have a common light source and divide a direction of a light axis thereof into two directions by using a DMD (Digital Mirror Device) or the like. In this case, the vehicular illuminating device arranges the DMD in front of the headlamp (the light source). On that basis, the vehicular illuminating device controls the DMD to illuminate only in the traveling direction of the vehicle, or controls the DMD to illuminate in both the traveling direction of the vehicle and the direction of the recommended route by using different illumination patterns.

According to the aspect of the present invention, the second illuminating part is controlled to illuminate in the direction of the recommended route, being guided by the route guiding part which guides the vehicle to the destination along the recommended route, by using the illumination pattern different from that of the first illuminating part which illuminates the traveling direction of the vehicle. Thus, the vehicular illuminating device can inform a driver of the direction of the recommended route in an easily comprehensible manner while ensuring a field of vision in the traveling direction of the vehicle.

Another aspect of the present invention may include an environment recognizing part configured to recognize an environment surrounding the vehicle, wherein the control part controls the second illuminating part so that the second illuminating part changes the illumination pattern depending on the environment surrounding the vehicle recognized by the environment recognizing part.

In this way, since the vehicular illuminating device illuminates in the direction of the recommended route by using an illumination pattern insusceptible to the environment surrounding the vehicle, the vehicular illuminating device can be applied to a variety of environments. The vehicular illuminating device can also inform a driver of the direction of the recommended route in a more easily comprehensible manner.

Effect of the Invention

According to the present invention, it is possible to provide a vehicular illuminating device which can inform a driver of a direction of a recommended route in an easily comprehensible manner while ensuring a field of vision in a traveling direction of a vehicle.

MODE FOR CARRYING OUT THE INVENTION

With reference to accompanying figures and embodiments, a mode for carrying out the present invention is described below.

[First Embodiment]

Figure 1:
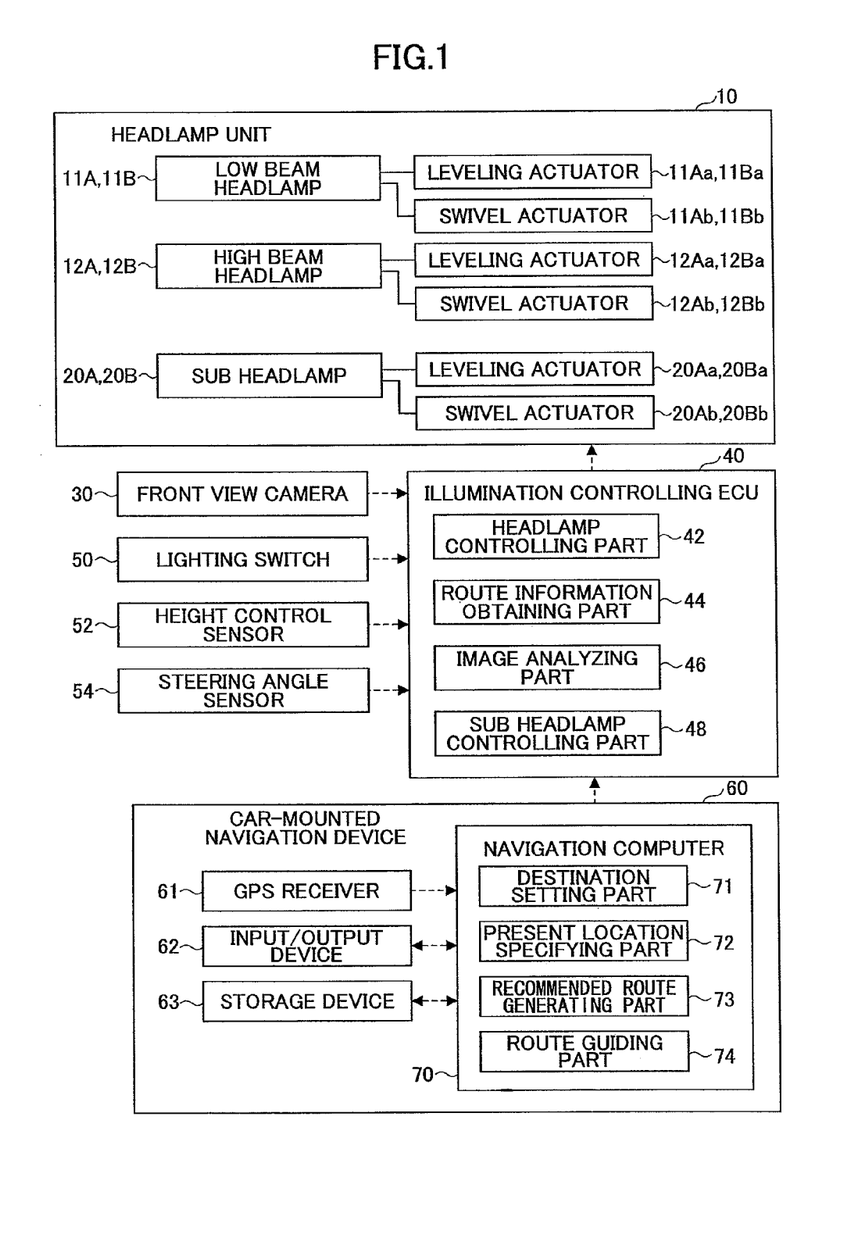
FIG. 1 is an example of a system configuration of a vehicular illuminating device 1 in accordance with an embodiment of the present invention.

With reference to the figures, a vehicular illuminating device 1 in accordance with an embodiment of the present invention is described below. FIG. 1 is an example of a system configuration of the vehicular illuminating device 1 in accordance with an embodiment of the present invention. The vehicular illuminating device 1 is provided with, as main components, a headlamp unit 10, a front view camera 30, and an illumination controlling ECU (Electronic Control Unit) 40.

The headlamp unit 10 is provided with, as components for illuminating a traveling direction of a vehicle, a left low beam headlamp 11A, a right low beam headlamp 11B, a left high beam headlamp 12A, a right high beam headlamp 12B, leveling actuators 11Aa, 11Ba, 12Aa, 12Ba which can adjust angles of their respective light axes up and down, and swivel actuators 11Ab, 11Bb, 12Ab, 12Bb which can adjust angles of their respective light axes right and left. Each of the leveling actuators and each of the swivel actuators operate in response to command signals from the illumination controlling ECU 40.

Each of the headlamps, for example, is a HID (High Intensity Discharge) lamp and includes a HID bulb as a main component. Gaseous xenon or metallic iodide is used to charge the HID bulb. The HID bulb emits light by arc discharge if voltage is applied to electrodes at both ends.

A headlamp driver having an H-bridge circuit for applying the voltage to the HID bulb is attached to each of the headlamps. The H-bridge circuit includes four semiconductor switching elements for the bridge (MOS transistor or the like) arranged in an H-bridge shape. The semiconductor switching elements for the bridge are controlled so that a set of diametrically located elements turns to an ON state simultaneously when a solenoid switch is set to an ON state by a command from the illumination controlling ECU 40. Then, a set of elements to be an ON state alternates; thereby, the polarity of the voltage applied to the HID bulb is inverted, and the HID bulb lights up with alternating current.

This configuration is only an example. Each of low beam headlamps may be a LED lamp and its headlamp driver may be configured to perform constant current control. Each of low beam headlamps 11A, 11B may also be a halogen lamp and its headlamp driver may also be a relaying device.

The headlamp unit 10 is also provided with a sub headlamp for illuminating in a direction of a recommended route. The sub headlamp is comprised of a pair of a left sub headlamp 20A and a right sub headlamp 20B as in the low beam headlamps 11A, 11B, for example. The sub headlamp may be comprised of a single sub headlamp. The sub headlamp 20A, 20B may take the form of a HID lamp, a LED lamp, a halogen lamp, or the like, as in each of the above described headlamps. A leveling actuator 20Aa, 20Ba which can adjust an angle of a light axis of the sub headlamp 20A, 20B up and down, and a swivel actuator 20Ab, 20Bb which can adjust an angle of a light axis of the sub headlamp 20A, 20B left and right, are attached to the sub headlamp 20A, 20B.

The sub headlamp 20A, 20B is preferably configured to be able to change color of emitted light. For example, the changeover of the color of the emitted light can be achieved by using a dimming film which can change its color from a predetermined color to a clear color (transparent color) depending on a state of voltage application. In this case, plural dimming films with different colors are stacked and then voltage control is performed so that only a dimming film having a color desired to be emitted becomes a colored state. The sub headlamp 20A, 20B is not limited to this configuration. It may be configured to replace a film mechanically, or to arrange plural lamps which emit different colors and can be switched.

The front view camera 30 is, for example, a camera utilizing an image pickup device such as a CCD (Charge-Coupled Device) or a CMOS (Complementary Metal Oxide Semiconductor) arranged at an upper central part of a windshield. The front view camera 30 captures an area in a forward and oblique downward direction of a vehicle repeatedly at intervals of several milliseconds. The image captured by the front view camera 30 is sent to the illumination controlling ECU 40 at regular intervals (e.g., for each captured frame) as an image signal generated by an interlaced method such as NTSC (National Television Standard Committee).

The illumination controlling ECU 40 is, for example, a microcomputer in which a CPU (Central Processing Unit) as a main component, a ROM (Read Only Memory), a RAM (Random Access Memory) and the like are interconnected through a bus. The illumination controlling ECU 40 is also provided with a storage device such as a HDD (Hard Disk Drive), a DVD (Digital Versatile Disk) drive, a CD-R (Compact Disc-Recordable) drive, an EEPROM (Electronically Erasable and Programmable Read Only Memory) or the like as well as an I/O port, a timer, a counter and the like. The storage device stores data and programs executed by the CPU.

The illumination controlling ECU 40 is connected to a lighting switch 50, a height control sensor 52, a steering angle sensor 54, a car-mounted navigation device 60 and the like through a private communication line or through a multiplex communication line which enables transmission and reception of information by plural devices. The communication between the devices through the multiplex communication line is achieved by an appropriate communication protocol such as a low-speed-body system communication protocol typified by a CAN (Controller Area Network) or a LIN (Local Interconnect Network), a multimedia-system communication protocol typified by a MOST (Media Oriented Systems Transport), a FlexRay, or the like.

The lighting switch 50 is, for example, configured as a part of a combination switch. The lighting switch 50 is provided with a headlamp switch, a dimmer switch, and the like. The headlamp switch can switch among three positions: an OFF position where all lights are turned off; a TAIL position where a tail lamp and a small lamp (a width indicator) are turned on; and a HEAD position where the tail lamp, the small lamp, and a headlamp are turned on. The dimmer switch can switch between a high beam state and a low beam state of the headlamp. The operating states of these switches are entered into the illumination controlling ECU 40.

The height control sensor 52 detects a vehicle height at a retaining part of each wheel (for convenience sake, the height control sensor 52 is illustrated as a single component). The detection value of the height control sensor 52 is entered into the illumination controlling ECU 40.

The steering angle sensor 54 is, for example, arranged within a steering column, and sends a steering angle signal to the illumination controlling ECU 40 via a steering controller.

The car-mounted navigation device 60 is, for example, provided with a GPS receiver 61, input/output device 62, a storage device 63, and a navigation computer 70.

The GPS receiver 61 receives a radio wave sent from a GPS satellite, demodulates the radio wave, and outputs a navigation message (a satellite signal) included in the radio wave to the navigation computer 70. The navigation message includes information about a satellite track, a correction value of a satellite clock, a correction coefficient for an ionosphere, a health message indicative of an operating state of the satellite itself, or the like. The input/output device 62 includes, for example, a microphone, a speaker, a buzzer, a display device, an input switch, or the like. The display device is, for example, configured as a touch panel, positions GUI (Graphical User Interface) switches at a predetermined position on a screen, detects a change in voltage or the like, and then recognizes a position touched by a user. The storage device 63 is, for example, a storage device such as a HDD, a DVD drive, a CD-R drive, an EEPROM, or the like. The storage device 63 stores map data in its storage medium. The map data render a shape of a road, for example, by using node points indicating intersections or the like and having coordinates (latitude, longitude), links connecting the node points, and storing corresponding road widths and corresponding road curvatures. The map data also have information including coordinates of main facilities, intersections, geographical names or the like which can be candidates for a destination to which the navigation device 60 leads, as positional information.

The navigation computer 70 is, for example, a computer unit having a configuration similar to the illumination controlling ECU 40. The navigation computer 70 includes as functional blocks a destination setting part 71, a present location specifying part 72, a recommended route generating part 73, a route guiding part 74, and the like.

The destination setting part 71 prompts, at a predetermined moment such as at the time of boarding, a user to set a destination by using the input/output device 62. Once the user sets the destination through a voice input or a touch input, the destination setting part 71 searches for the destination using the positional information in the map data, and outputs the searched out coordinates of the destination to the recommended route generating part 73.

The present location specifying part 72 analyzes navigation messages from plural of the GPS satellites, and calculates a present location (latitude, longitude, and altitude) of a vehicle. Specifically, the present location specifying part 72 calculates a position $(Xs, Ys, Zs)$ in a world coordinate system (WGS84 for example) for each of the GPS satellites based on information about satellite tracks included in the navigation messages, calculates pseudo distances between each of the GPS satellites and the vehicle by multiplying the arrival time (time point of arrival minus time point of origin) of radio waves by the speed of light, and calculates a present location of the vehicle based on the calculated positions and the calculated pseudo distances for the plural GPS satellites and the principle of triangulation. The present location of the vehicle may be corrected based on outputs of various sensors such as a speed sensor, a gyro sensor or the like or based on various information received through a beacon receiver or a FM multiple broadcast receiver.

The recommended route generating part 73 generates, by using the Dijkstra method or the like, a recommended route from the present location of the vehicle specified by the present location specifying part 72 to the destination outputted by the destination setting part 71, and outputs the recommended route to the route guiding part 74. The above process is executed repeatedly in response to changes in the present location of the vehicle.

The route guiding part 74 controls navigation displays or audio assists through the input/output device 62 so that the driver can drive the vehicle along the recommended route generated by the recommended route generating part 73. Specifically, the route guiding part 74 controls the input/output device 62 so that guidance for turning at intersections, a highway usage guide, guidance reporting that the vehicle is approaching the destination, or the like is performed.

The present invention is not limited to a configuration where the car-mounted device generates a recommended route by itself. The present invention may include a configuration where the car-mounted device obtains a recommended route from an information server outside the vehicle by using a wireless communication device. In this case, the navigation computer 70 sends the present location of the vehicle, the coordinates of the destination, and the like to the information server outside the vehicle, and obtains information about the recommended route generated in the information server.

The illumination controlling ECU 40, to which such devices are connected, includes as major functional blocks a headlamp controlling part 42, a route information obtaining part 44, an image analyzing part 46, and a sub headlamp controlling part 48. The major functional blocks are activated by the CPU which executes programs stored in the storage device. These functional blocks are not necessarily based on clearly-differentiated separate programs. One and the same program may include parts for achieving plural functional blocks.

The headlamp controlling part 42 controls the low beam headlamp 11A, 11B or the high beam headlamp 12A, 12B so that it illuminates in the traveling direction of the vehicle. Specifically, the headlamp controlling part 42 controls lighting-up of the low beam headlamp or the high beam headlamp depending on the operating state of the lighting switch 50. The headlamp controlling part 42 also controls leveling actuators depending on the tilt of the vehicle calculated on the detection value of the height control sensor 52 so that the headlamp illuminates a desired area on a road surface (for example, an area which ranges from * [m] to  [m] ahead of the vehicle). The headlamp controlling part 42 also refers to output values of the steering angle sensor 54, so that if the vehicle is turning at an angle greater than a predetermined angle, the headlamp controlling part 42** controls the swivel actuators so that the headlamp emits light not in a direction of the centerline of the vehicle but in a direction of the turn. The lighting-up control of the headlamp may be performed automatically by detecting the brightness outside the vehicle.

The route information obtaining part 44 obtains from the navigation computer 70 the information about the present location of the vehicle, the shape of the road ahead of the vehicle, the recommended route, and the like. Then, the route information obtaining part 44 determines whether there is a bifurcation point (an intersection, a T-junction, a bifurcation point or an exit point of a toll road, or the like) within a predetermined distance ahead of the vehicle, and specifies a direction which the route guiding part 74 selects at the bifurcation point (a direction of the recommended route). The navigation computer 70 may have the above described functions and the illumination controlling ECU 40 may obtain from the navigation computer 70 the information about the coordinates of the bifurcation point and the direction of the recommended route at the bifurcation point.

The image analyzing part 46 analyzes an image signal from the front view camera 30 and quantifies an environment (general brightness, a location of a building or the like which can constitute a background, illumination intensity of a road surface, the number of other vehicles or locations of other vehicles, and the like) on a road extending in a direction of a recommended route at a bifurcation point.

Then, the sub headlamp controlling part 48 controls the sub headlamps 20A, 20B (and/or the leveling actuators 20Aa, 20Ba, the swivel actuators 20Ab, 20Bb attached thereto) so that they illuminate in the direction of the recommended route selected by the route guiding part 74 with an illumination pattern different from the one used by the low beam headlamp or the high beam headlamp. The illumination pattern includes at least one of color, luminance, and difference between blinking and always-on as a parameter. Thus, the sub headlamps 20A, 20B are controlled to illuminate in the direction of the recommended route with a different color or luminance from those of the low beam headlamp or the high beam headlamp, or by blinking.

The sub headlamp controlling part 48 also controls the sub headlamps 20A, 20B to change the illumination pattern depending on an environment surrounding the vehicle which is quantified by the image analyzing part 46. For example, if the captured road extending in the direction of the recommended route at the bifurcation point is bright, the sub headlamp controlling part 48 changes the color of the light emitted by the sub headlamps 20A, 20B from whitish color to reddish color or bluish color. The sub headlamp controlling part 48 may also switch the illumination pattern of the sub headlamps 20A, 20B from always-on to blinking if the number of other vehicles is large.

Figure 2:
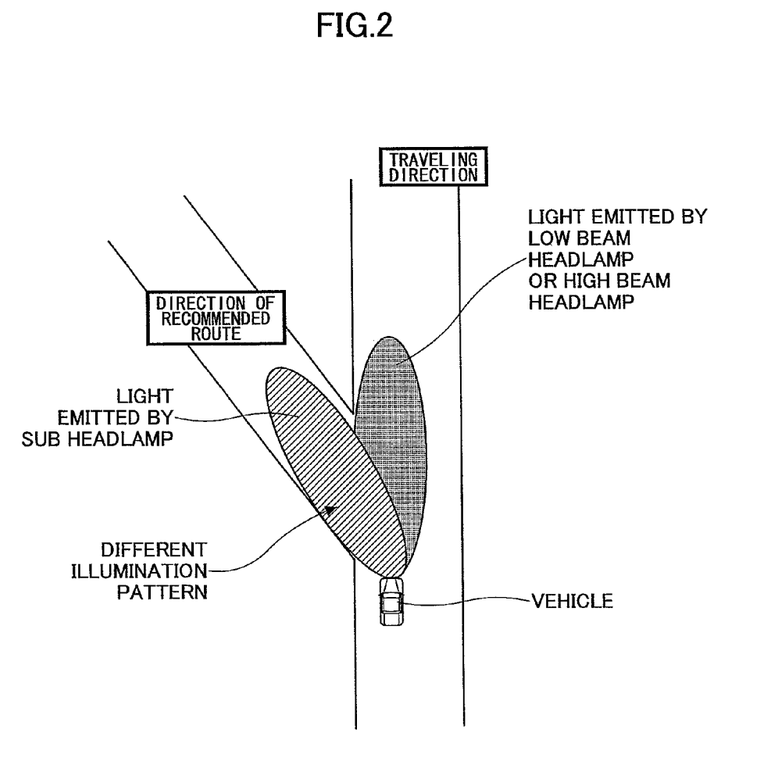
FIG. 2 is a diagram diagrammatically illustrating an appearance of light emitted by the vehicular illuminating device 1 of the present embodiment.

FIG. 2 diagrammatically illustrates an appearance of light emitted by the vehicular illuminating device 1 of the present embodiment. As illustrated, the vehicular illuminating device 1 of the present embodiment not only illuminates in the traveling direction with the low beam headlamp or the high beam headlamp, but also illuminates in the direction of the recommended route with the sub headlamps 20A, 20B by using a different illumination pattern from that of the low beam headlamp or the high beam headlamp. Thus, the vehicular illuminating device 1 can inform a driver of the direction of the recommended route in an easily comprehensible manner while ensuring a field of vision in the traveling direction of the vehicle.

Figure 3:
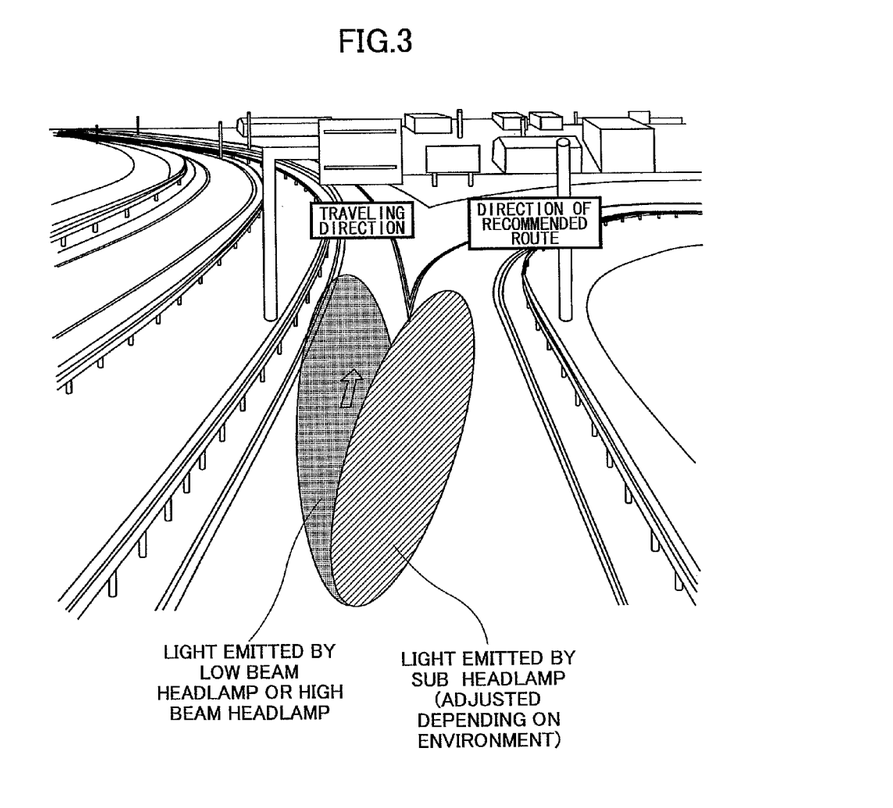
FIG. 3 is a diagram diagrammatically illustrating an image obtained by a front view camera 30, where the light emitted by the vehicular illuminating device 1 of the present embodiment is captured.

FIG. 3 diagrammatically illustrates an image obtained by a front view camera 30, where the light emitted by the vehicular illuminating device 1 of the present embodiment is captured. As illustrated, the vehicular illuminating device 1 of the present embodiment illuminates, depending on an environment surrounding the vehicle which is quantified by the image analyzing part 46, in the direction of the recommended route by using an illumination pattern insusceptible to the environment surrounding the vehicle. Thus, the vehicular illuminating device 1 can be applied to a variety of environments. The vehicular illuminating device 1 can also inform a driver of the direction of the recommended route in a more easily comprehensible manner.

Figure 4:
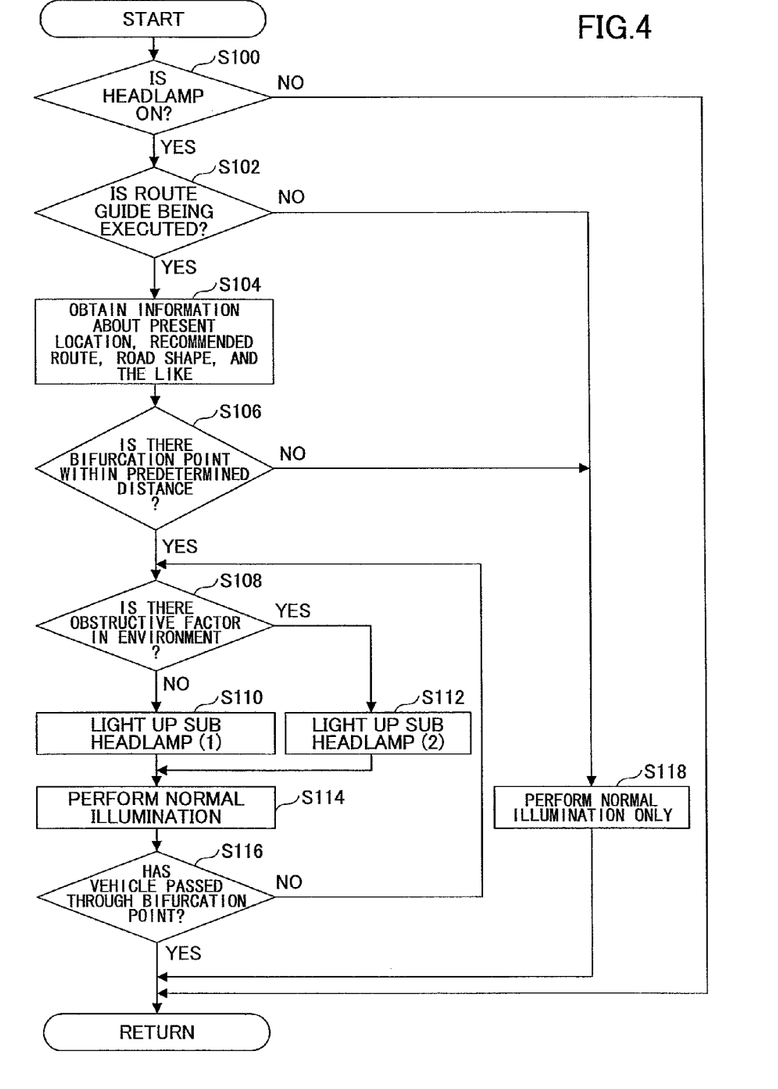
FIG. 4 is a flowchart illustrating a flow of a characteristic process executed mainly by a sub headlamp controlling part 48.

In what follows, a flow of a characteristic process executed mainly by the sub headlamp controlling part 48 is described. FIG. 4 is a flowchart illustrating the flow of the characteristic process executed mainly by the sub headlamp controlling part 48.

First, the illumination controlling ECU 40 determines whether the low beam headlamp or the high beam headlamp is ON state (S100). If the low beam headlamp and the high beam headlamp are not ON state, the illumination controlling ECU 40 terminates a routine of this flow without executing any other procedures. This is because a route guide using the sub headlamps 20A, 20B is not effective if the low beam headlamp and the high beam headlamp are not ON state, i.e. if it is daytime.

If the low beam headlamp or the high beam headlamp is ON state, the illumination controlling ECU 40 determines whether the car-mounted navigation device 60 is executing a route guide (S102). If the car-mounted navigation device 60 is not executing a route guide, the illumination controlling ECU 40 only performs a normal illumination with the low beam headlamp or the high beam headlamp (S118).

If the car-mounted navigation device 60 is executing a route guide, the illumination controlling ECU 40 obtains information about a present location of the vehicle, a road shape, a recommended route, or the like from the navigation computer 70 (S104). Then, the illumination controlling ECU 40 determines whether there is a bifurcation point within a predetermined distance from the vehicle (S106). If there is no bifurcation point within the predetermined distance from the vehicle, the illumination controlling ECU 40 only performs the normal illumination by the low beam headlamp or the high beam headlamp (S118).

If there is a bifurcation point within the predetermined distance from the vehicle, the illumination controlling ECU 40 determines whether an environment surrounding the vehicle which is quantified by the image analyzing part 46 includes an obstructive factor which prevents a driver from perceiving light to be emitted (S108).

If the environment surrounding the vehicle does not include an obstructive factor which prevents a driver from perceiving the light to be emitted, the illumination controlling ECU 40 controls the sub headlamps 20A, 20B to illuminate in the direction of the recommended route by using an illumination pattern different from that of the low beam headlamp or the high beam headlamp. The illumination controlling ECU 40 also performs the normal illumination using the low beam headlamp or the high beam headlamp (S110, S114).

On the other hand, if the environment surrounding the vehicle includes an obstructive factor which prevents a driver from perceiving the light to be emitted, until the vehicle passes through the bifurcation point, as described above, the illumination controlling ECU 40 switches the illumination pattern of the sub headlamps 20A, 20B from always-on to blinking, or changes color or luminance to more easily comprehensible color or luminance. The illumination controlling ECU 40 also performs the normal illumination with the low beam headlamp or the high beam headlamp (S112, S114).

Then, the illumination controlling ECU 40 executes the procedures from S108 to S114 repeatedly until the illumination controlling ECU 40 determines that the vehicle has passed through the bifurcation point (S116).

As described above, the vehicular illuminating device 1 of the present embodiment can inform a driver of the direction of the recommended route in an easily comprehensible manner while ensuring a field of vision in the traveling direction of the vehicle.

With reference to the above embodiment, the best mode for carrying out the present invention has been described. However, the present invention is not limited to the above embodiment. Various changes and modifications may be made without departing from the scope of the present invention.

For example, the front view camera 30 and the image analyzing part 46 may be omitted. In this case, an environment surrounding the vehicle is not considered.

In the above embodiment, the configuration having the sub headlamp for illuminating in the direction of the recommended route is described. However, the present invention is not limited to this configuration. The present invention may include a configuration which has one and the same light source and divides the direction of its light axis into two directions by using a DMD (Digital Mirror Device) or the like. In this case, the vehicular illuminating device 1 arranges the DMD in front of the headlamp (the light source). On that basis, the vehicular illuminating device 1 controls the DMD to illuminate only the traveling direction of the vehicle, or controls the DMD to illuminate both the traveling direction of the vehicle and the direction of the recommended route by using different illumination patterns.

The present international application claims priority from Japanese Patent Application No. 2009-221298 filed on Sep. 25, 2009, which is entirely incorporated herein by reference.

Industrial Applicability

The present invention is applicable to automobile manufacturing industries and automobile component manufacturing industries.

EXPLANATION OF REFERENCE SIGNS

1 vehicular illuminating device
10 headlamp unit
11A, 11B low beam headlamp
12A, 12B high beam headlamp
11Aa, 11Ba, 12Aa, 12Ba leveling actuator
11Ab, 11Bb, 12Ab, 12Bb swivel actuator
20A, 20B sub headlamp
20Aa, 20Ba leveling actuator
20Ab, 20Bb swivel actuator
30 front view camera
40 illumination controlling ECU
42 headlamp controlling part
44 route information obtaining part
46 image analyzing part
48 sub headlamp controlling part
50 lighting switch
52 height control sensor
54 steering angle sensor
60 car-mounted navigation device
61 GPS receiver
62 input/output device
63 storage device
70 navigation computer
71 destination setting part
72 present location specifying part
73 recommended route generating part
74 route guiding part

The invention claimed is:

1. A vehicular illuminating device, comprising:
a first illuminating part configured to illuminate in a traveling direction of a vehicle;
a second illuminating part configured to be able to change at least one of color, luminance, and blinking/always-on state;
a control part configured to control the second illuminating part so that the second illuminating part can illuminate, before the vehicle passes through a bifurcation point, in a direction of a recommended route at the bifurcation point which is different from the traveling direction while differentiating the at least one of color, luminance, and blinking/always-on state from that of the first illuminating part, if the direction of the recommended route provided by a route guiding part is different from the traveling direction; and
an environment recognizing part configured to recognize an environment surrounding the vehicle,
wherein the control part changes at least one of color, luminance, and blinking/always-on state of the second illuminating part if the environment surrounding the vehicle recognized by the environment recognizing part includes an obstructive factor which prevents a driver from perceiving light emitted by the second illuminating part.

2. The vehicular illuminating device according to claim 1, wherein the control part changes a color of light emitted by the second illuminating part if the environment surrounding the vehicle recognized by the environment recognizing part includes an obstructive factor which prevents a driver from perceiving the light emitted by the second illuminating part.

* * * * *